US010455009B2

(12) United States Patent
Moniz et al.

(10) Patent No.: US 10,455,009 B2
(45) Date of Patent: *Oct. 22, 2019

(54) OPTIMIZING A LOAD BALANCER CONFIGURATION

(71) Applicant: Amazon Technologies, Inc., Seattle, WA (US)

(72) Inventors: Samuel Leonard Moniz, Seattle, WA (US); Kyle Bradley Peterson, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/159,435

(22) Filed: Oct. 12, 2018

(65) Prior Publication Data
US 2019/0082006 A1 Mar. 14, 2019

Related U.S. Application Data

(63) Continuation of application No. 14/133,529, filed on Dec. 18, 2013, now Pat. No. 10,104,169.

(51) Int. Cl.
*G06F 15/16* (2006.01)
*H04L 29/08* (2006.01)

(52) U.S. Cl.
CPC ...... *H04L 67/1017* (2013.01); *H04L 67/1002* (2013.01); *H04L 67/1008* (2013.01); *H04L 67/1025* (2013.01); *H04L 67/1027* (2013.01); *H04L 67/1029* (2013.01); *H04L 67/322* (2013.01)

(58) Field of Classification Search
CPC .................. H04L 67/1002; H04L 67/1027
See application file for complete search history.

(56) References Cited

U.S. PATENT DOCUMENTS

| 5,539,883 | A | 7/1996 | Allon et al. |
| 7,069,324 | B1 | 6/2006 | Tiwana et al. |
| 7,086,061 | B1 | 8/2006 | Joshi et al. |
| 7,089,293 | B2 | 8/2006 | Grosner et al. |

(Continued)

OTHER PUBLICATIONS

Citrix, Netscaler 9000 Series Installation and Configuration Guide, vol. 2, 2005, all pages (Year: 2005).*

(Continued)

*Primary Examiner* — Hieu T Hoang
(74) *Attorney, Agent, or Firm* — Robert C. Kowert; Meyertons, Hood, Kivlin, Kowert & Goetzel, P.C.

(57) ABSTRACT

Methods, systems, and computer-readable media for optimizing a load balancer configuration are disclosed. A load balancer is configured to perform traffic management for a distributed system. A new component is deployed to the distributed system or a performance deviation is predicted in the distributed system. In response to the initiation of the deployment or the prediction of the performance deviation, the configuration of the load balancer is modified from a first state to a second state. Modifying the configuration of the load balancer modifies the traffic management for the distributed system. If the configuration was changed due to a deployment, the configuration of the load balancer is restored from the second state to the first state after a period of time has elapsed.

20 Claims, 12 Drawing Sheets

(56) References Cited

U.S. PATENT DOCUMENTS

| | | |
|---|---|---|
| 7,389,510 B2 | 6/2008 | Forrester |
| 7,773,533 B2 | 8/2010 | Bays |
| 7,881,325 B2 | 2/2011 | Cheethirala et al. |
| 8,028,334 B2 | 9/2011 | Andreev et al. |
| 8,166,163 B2 | 4/2012 | Ma et al. |
| 8,185,909 B2 | 5/2012 | Sigal et al. |
| 8,296,434 B1 | 10/2012 | Miller et al. |
| 8,412,807 B2 | 4/2013 | DeLima et al. |
| 8,510,747 B2 | 8/2013 | Tian et al. |
| 8,675,557 B2 | 3/2014 | Le |
| 9,264,409 B2 | 2/2016 | Sproles et al. |
| 10,104,169 B1 | 10/2018 | Moniz et al. |
| 2002/0107962 A1 | 8/2002 | Richter et al. |
| 2002/0194342 A1* | 12/2002 | Lu .......................... H04L 29/06 709/227 |
| 2004/0103194 A1 | 5/2004 | Islam et al. |
| 2005/0038890 A1* | 2/2005 | Masuda ................. H04L 29/06 709/224 |
| 2006/0026599 A1 | 2/2006 | Herington et al. |
| 2009/0034537 A1 | 2/2009 | Colrain et al. |
| 2010/0082787 A1 | 4/2010 | Kommula et al. |
| 2010/0162260 A1 | 6/2010 | Ibrahim |
| 2011/0035753 A1 | 2/2011 | Palczak et al. |
| 2012/0026878 A1 | 2/2012 | Scaglione |
| 2015/0039763 A1 | 2/2015 | Chaudhary et al. |

OTHER PUBLICATIONS

Citrix, Load Balancing Algorithms, Aug. 2013, all pages (Year: 2013).*

* cited by examiner

OPTIMIZING A LOAD BALANCER CONFIGURATION

This application is a continuation of U.S. patent application Ser. No. 14/133,529, filed Dec. 18, 2018, now U.S. Pat. No. 10,104,169, which is hereby incorporated by reference herein in its entirety.

BACKGROUND

Many companies and other organizations operate computer networks that interconnect numerous computing systems to support their operations, such as with the computing systems being co-located or instead located in multiple distinct geographical locations. For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

Load balancers may provide client access to a fleet of hosts that implement a marketplace. A load balancer may receive a request from a client and direct the client request to an appropriate one of the hosts. Various load balancing algorithms have been employed to select a host to serve a given client request; each algorithm may have advantages and disadvantages. For example, using a "least connections" algorithm, the load balancer may select the host that is currently servicing the least amount of traffic. However, a faulty host may contribute to a problem known as the "black hole effect" when the least connections algorithm is used. If the faulty host is handling requests very quickly by failing them, then a disproportionate amount of client traffic may be routed to the faulty host using the least connections algorithm. Thus a single faulty host in combination with a load balancer may cause a disproportionate amount of client requests to fail.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for optimizing a load balancer configuration are described. Using the systems and methods described herein, the configuration of a load balancer may be changed under particular circumstances to optimize the use of a fleet of hosts. When a new component (e.g., one or more services or one or more hosts) is deployed to a system, the configuration of a load balancer may be changed on a temporary basis. For example, the load balancing algorithm used by the load balancer may be changed from a first algorithm (e.g., a least connections algorithm) to a second algorithm (e.g., a round robin algorithm). The original configuration (e.g., the first load balancing algorithm) may be restored after a suitable period of time has elapsed. Similar measures may be taken in response to the prediction or detection of a performance deviation in the system. In this manner, performance problems such as the "black hole effect" may be mitigated proactively or reactively.

Figure 1:
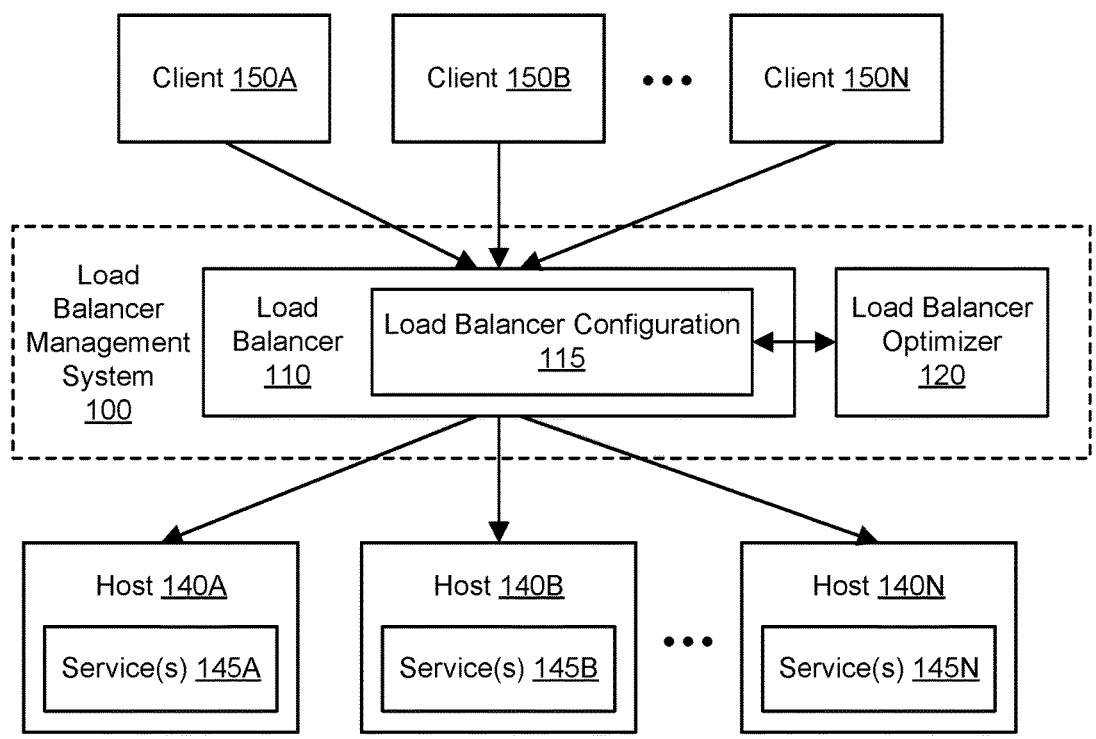
FIG. 1 illustrates an example system environment for optimizing a load balancer configuration, according to some embodiments.

FIG. 1 illustrates an example system environment for optimizing a load balancer configuration, according to some embodiments. The example system environment may include a load balancer management system 100. The load balancer management system 100 may include a load balancer 110 and a load balancer optimizer 120. In one embodiment, the load balancer 110 is configured to perform traffic management for a distributed system. The distributed system may include a plurality of hosts, such as hosts 140A and 140B through 140N. A plurality of clients, such as clients 150A and 150B through 150N, may provide client requests to the load balancer 110. In one embodiment, the load balancer 100 may direct each request from one of the clients 150A-150N to an appropriate one of the hosts 140A-140N. The load balancer 110 may select the host for any given client request based on a load balancer configuration 115. In one embodiment, health checks may be performed on hosts and/or services provided by hosts before the load balancer selects one of the hosts to receive client requests. As will be discussed in greater detail below, the load balancer optimizer 120 may cause modification of the load balancer configuration 115 in suitable circumstances. Accordingly, the load balancer optimizer 120 may change the way in which the load balancer 110 manages traffic from the clients 150A-150N to the hosts 140A-140N.

The distributed system may be a service-oriented system that implements a service-oriented architecture. The service-oriented system may include multiple services 145A-145N configured to communicate with each other (e.g., through message passing) to carry out various tasks, such as business functions. For example, as shown in FIG. 1, each host may run one or more services, such as service(s) 145A on host 140A, service(s) 145B on host 140B, and service(s) 145N on host 140N. It is contemplated that any suitable number of services may be used with the service-oriented system. The services 145A-145N may represent different services (e.g., different sets of program code) and/or different instances of the same service. The services 145A-145N may be implemented using the plurality of hosts 140A-140N, any of which may be implemented by the example computing device 3000 illustrated in FIG. 6. The hosts 140A-140N may be located within a single data center or across different geographical locations. In one embodiment, multiple services and/or instances of the same service may be implemented using the same host.

At least a portion of the services 145A-145N may be invoked by client requests received at the hosts 140A-140N from the clients 150A-150N. Each service may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

In one embodiment, the clients 150A-150N may represent other services within the service-oriented system. The service-oriented system may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services 145A-145N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

It is contemplated that the load balancer management system 100 and/or service-oriented system may include additional components not shown, fewer components than shown, or different combinations, configurations, or quantities of the components shown. Although three hosts 140A, 140B, and 140N are illustrated for purposes of example, it is contemplated that any suitable number of hosts may be used in conjunction with the load balancer management system 100. Although three clients 150A, 150B, and 150N are illustrated for purposes of example, it is contemplated that any suitable number of clients may be used in conjunction with the load balancer management system 100. The load balancer management system 100 may include one or more computing devices, any of which may be implemented by the example computing device 3000 illustrated in FIG. 6. In various embodiments, the functionality of the different services, components, and/or modules of the load balancer management system 100 may be provided by the same computing device or by different computing devices. If any of the various components are implemented using different computing devices, then the respective computing devices may be communicatively coupled, e.g., via a network. Each component of the load balancer management system 100 may represent any combination of software and hardware usable to perform their respective functions, as discussed as follows.

In some embodiments, the hosts 140A-140N may be implemented as virtual compute instances or as physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 6.

In one embodiment, the load balancer management system 100 may be used in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

Figure 2A:
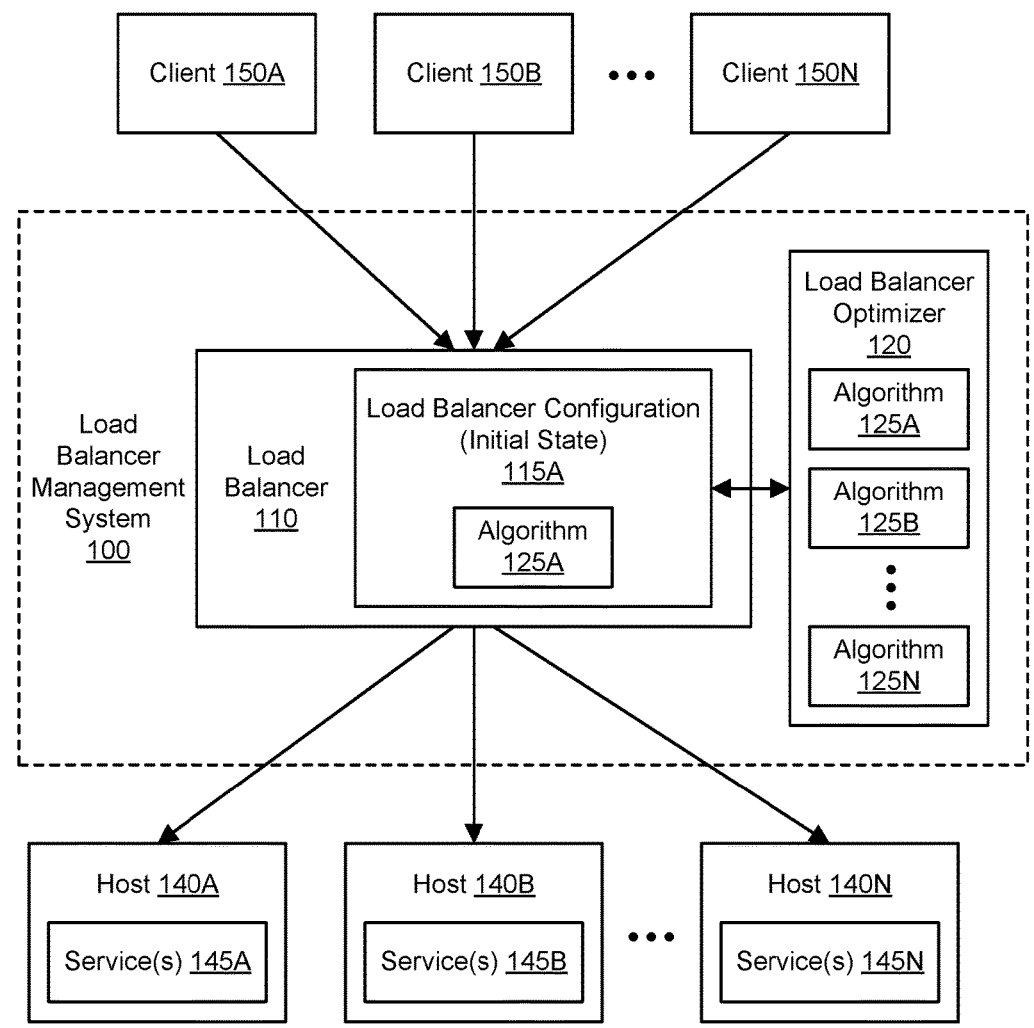
FIGS. 2A-2C illustrate example system environments for optimizing a load balancer configuration, including load balancer algorithm modification, according to some embodiments.
Figure 2B:
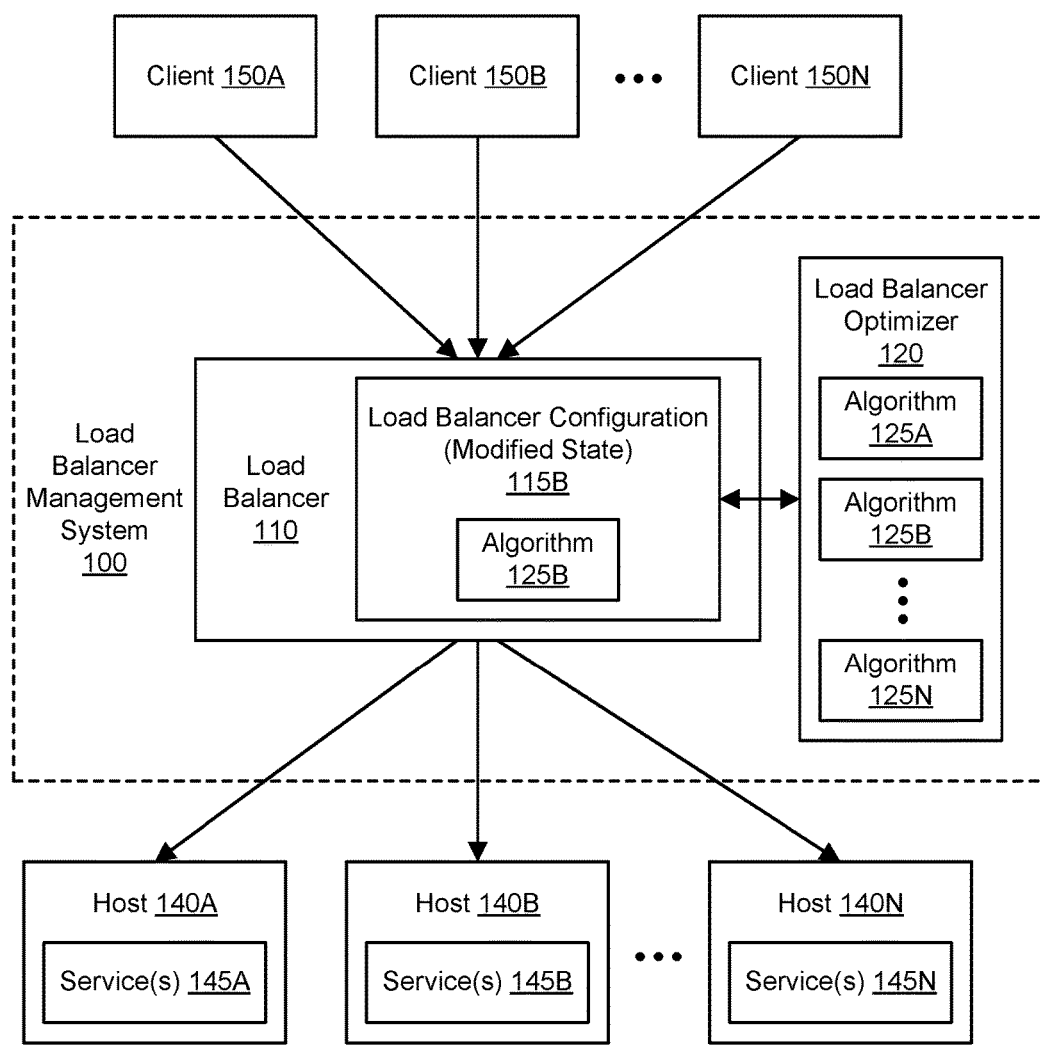
Figure 2C:
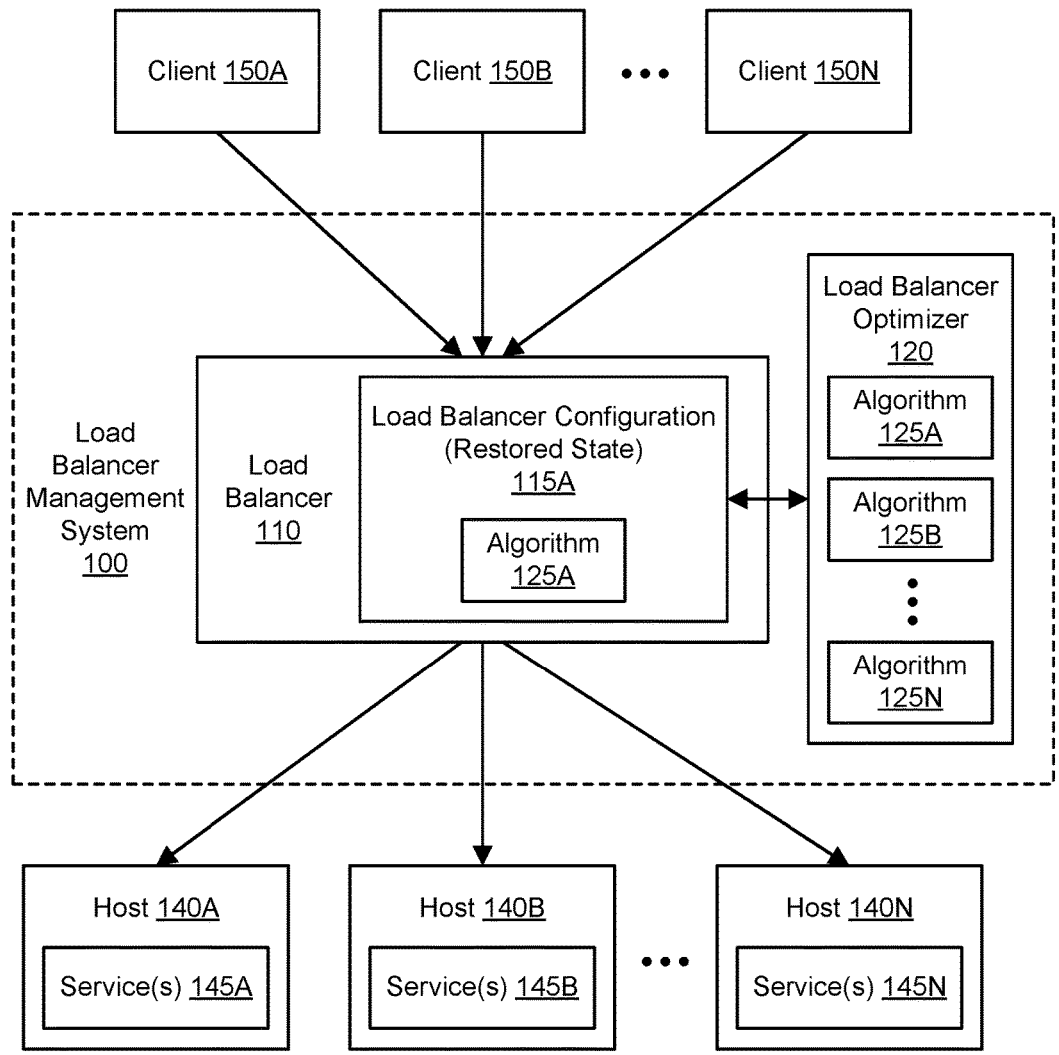

FIGS. 2A-2C illustrate example system environments for optimizing a load balancer configuration, including load balancer algorithm modification, according to some embodiments. FIG. 2A illustrates an initial state of a load balancer configuration, FIG. 2B illustrates a modified initial state of the load balancer configuration, and FIG. 2C illustrates a restored state of the load balancer configuration. As shown in FIG. 2A, the load balancer 110 may operate to direct traffic to the hosts 140A-140N based on an initial state 115A of the load balancer configuration. The initial state 115A of the load balancer configuration may dictate how the load balancer 110 directs traffic to the hosts 140A-140N, e.g., by providing a basis for the load balancer 110 to select a particular host for a given client request. The initial state 115A of the load balancer configuration may include a load balancing algorithm 125A.

The load balancer optimizer 120 may store or have access to a plurality of load balancing algorithms, such as algorithms 125A and 125B through 125N. Although three algorithms 125A-125N are illustrated for purposes of example, it is contemplated that any suitable number of load balancing algorithms may be used in conjunction with the load balancer management system 100. Any suitable type of load balancing algorithm may be used with the load balancer management system 100. In one embodiment, one or more of the load balancing algorithms 125A-125N may be a least connections algorithm. A least connections algorithm may use the number of currently open or active connections to each service or host to decide which one is least loaded; a new request may then be allocated to the least loaded service or host. A weighted least connections algorithm may distributed requests in a similar manner, but weights may be considered to permit the efficient use of heterogeneous fleets. In one embodiment, one or more of the load balancing algorithms 125A-125N may be a round robin algorithm. A round robin algorithm may spread requests evenly across services or hosts, e.g., by distributing requests in rotation regardless of the current load at a service or host. A weighted round robin algorithm may spread request across services or hosts based on weights associated with each service or host.

In one embodiment, one or more of the load balancing algorithms 125A-125N may be a least response time algorithm. A least response time algorithm may distribute requests to the service with the minimum average response time. In one embodiment, one or more of the load balancing algorithms 125A-125N may be a least bandwidth algorithm. A least bandwidth algorithm may select the service or host that is currently serving the least traffic, e.g., measured in megabits per second. In one embodiment, one or more of the load balancing algorithms 125A-125N may select a service or host based on the identity of the client, service, or host as expressed in the request, e.g., by domain name or IP address. In one embodiment, one or more of the load balancing algorithms 125A-125N may select a service or host based on a hash of all or part of the incoming request.

At any suitable point in time, the load balancer optimizer 120 may ascertain the current state of the load balancer configuration, including the algorithm currently used by the load balancer 110. For example, at the point in time represented by FIG. 2A, the load balancer optimizer 120 may ascertain the initial state 115A of the load balancer configuration, including the algorithm 125A currently used by the load balancer 110. The load balancer optimizer 120 may use any suitable technique or interface to communicate with the load balancer 110.

As shown in FIG. 2B, the load balancer optimizer 120 may cause the state of the load balancer configuration to be modified. In one embodiment, the load balancer optimizer 120 may cause the state of the load balancer configuration to be modified based on the deployment of one or more new components to the service-oriented system. The load balancer optimizer 120 may cause the state of the load balancer configuration to be modified based on the detection of a performance problem in the service-oriented system. It is contemplated that other types of events, including user instructions, may provide a suitable basis for the load balancer optimizer 120 to cause the state of the load balancer configuration to be modified. When the state of the load balancer configuration is modified, the initial state 115A may be replaced by a modified state 115B. The modified state 115B of the load balancer configuration may dictate how the load balancer 110 directs traffic to the hosts 140A-140N, e.g., by providing a different basis than that of the initial state 115A for the load balancer 110 to select a particular host for a given client request. The modified state 115B of the load balancer configuration may include a different load balancing algorithm 125B. In one embodiment, the different load balancing algorithm 125B may be selected by the load balancer optimizer 120. For example, the first load balancing algorithm 125A (e.g., a least connections algorithm) may prioritize latency and/or cost, the second load balancing algorithm 125B (e.g., a round robin algorithm) may prioritize availability, and the load balancer optimizer 120 may select the second load balancing algorithm 125B in order to prioritize availability over latency and/or cost for a period of time.

As shown in FIG. 2C, the load balancer optimizer 120 may cause the state of the load balancer configuration to be restored. In one embodiment, the state may be restored after a predetermined period of time has elapsed since the state was modified. In one embodiment, the state may be restored based on performance analysis of the performance of the hosts 140A-140N and/or services 145A-145N. When the state of the load balancer configuration is restored, the modified state 115B may be replaced by a restored state 115A. The restored state 115A of the load balancer configuration may dictate how the load balancer 110 directs traffic to the hosts 140A-140N, e.g., using the same basis as that of the initial state 115A for the load balancer 110 to select a particular host for a given client request. The restored state 115A of the load balancer configuration may include the same load balancing algorithm 125A as the initial state.

Figure 2D:
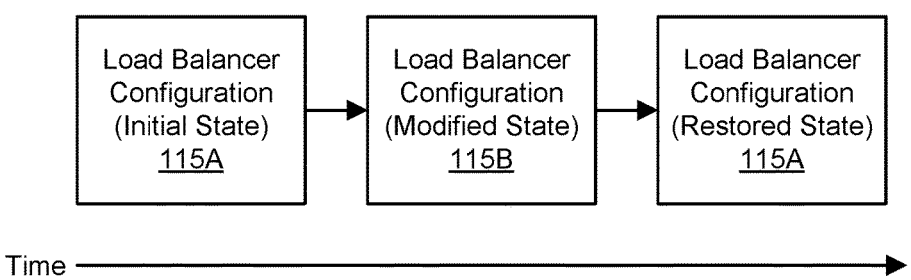
FIGS. 2D-2E illustrate example timelines for optimizing a load balancer configuration, according to some embodiments.
Figure 2E:
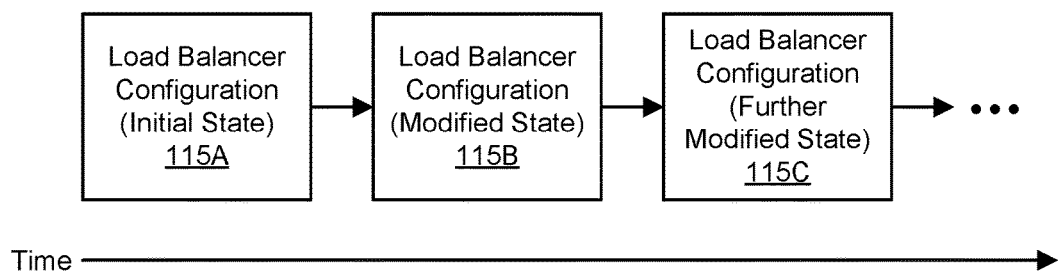

FIGS. 2D and 2E illustrate example timelines for optimizing a load balancer configuration, according to some embodiments. As shown in FIG. 2D, the load balancer configuration may be changed from a first state (i.e., an initial state) 115A to a second state (i.e., a modified state) 115B and back to the first state 115A over time. In one embodiment, the load balancer configuration may be changed and then restored as part of a deployment workflow. The modification of a load balancer configuration based on component deployment is discussed further with respect to FIGS. 4A-4B.

In some embodiments, the load balancer configuration may be continuously changed or adjusted over time. As shown in FIG. 2E, for example, the load balancer configuration may be changed from a first state (i.e., an initial state) 115A to a second state (i.e., a modified state) 115B and then to a third state (i.e., a further modified state) 115C over time. The load balancer configuration may be changed or adjusted many times based on the analysis of performance metrics collected over time. For example, if performance metrics for a particular host indicate a comparatively high rate of CPU utilization, then the load balancing configuration may be changed to reduce a weight associated with that particular host in a round robin load balancing algorithm. In one embodiment, configuration parameters such as the weights associated with particular hosts or instances of services may be adjusted over and over again based on current performance metrics.

In one embodiment, performance metrics may be used to determine an existing performance deviation for a host or service. In one embodiment, performance metrics may be used to predict a future performance deviation for a host or service. A performance deviation may be predicted by using performance metrics to anticipate that a host or service is likely to cross a performance threshold in the future. The performance deviation may represent a performance degradation, a performance problem, or any other suitable deviation from a service level agreement (SLA) or other set of expectations regarding performance.

Figure 3:
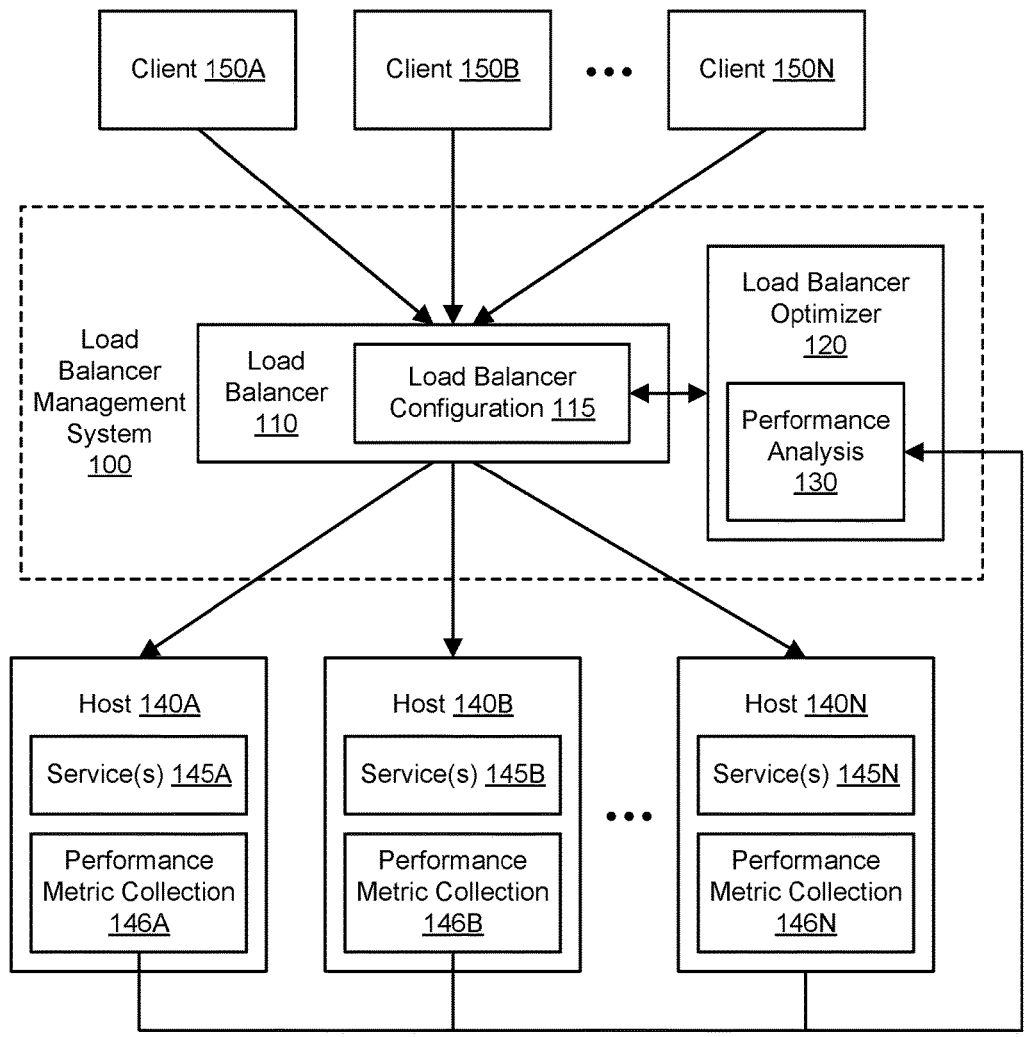
FIG. 3 illustrates an example system environment for optimizing a load balancer configuration, including optimization based on performance metrics, according to some embodiments.

FIG. 3 illustrates an example system environment for optimizing a load balancer configuration, including optimization based on performance metrics, according to some embodiments. In one embodiment, each host may include a component for performance metric collection. For example, host 140A may include a performance metric collection component 146A, host 140B may include a performance metric collection component 146B, and host 140N may include a performance metric collection component 146N. Each performance metric collection component 146A-146N may use any suitable technique(s) to collect data indicative of the performance of a host and/or service. For example, the performance metrics may relate to processor usage, memory usage, storage usage, other resource usage, network latency, network bandwidth, the number of connections to clients, request queue length, service-specific error counts, or any other suitable aspect of computing performance. In one embodiment, the performance analysis may be conducted repeatedly or periodically before and/or after the modification of the load balancer configuration 115.

In one embodiment, performance metrics collected using the performance metric collection components 146A-146N may be sent to a performance analysis component 130 of the load balancer optimizer 120. The performance metrics may be sent to the performance analysis component 130 periodically and at any suitable time. The performance analysis component 130 may perform any suitable techniques to aggregate the performance metrics and/or analyze the performance metrics. For example, the performance analysis component 130 may use latency metrics collected at the hosts 140A-140N over a period of time to determine an average latency for each of the hosts 140A-140N over the period of time.

In one embodiment, the load balancer optimizer 120 may initiate the modification of the load balancer configuration 115 based on a performance deviation detected by the performance analysis component 130. A performance deviation may represent a performance degradation, a performance problem, or any other suitable deviation from a service level agreement (SLA) or other set of expectations regarding performance. As used herein, the term "performance deviation" generally includes any aspect of computing performance that is suboptimal or otherwise beneath performance expectations. For example, if latency metrics for the hosts 140A-140N indicate that one host is processing requests much more rapidly than the other hosts, then the performance analysis component 130 may determine that a black hole problem is likely to exist. Based on this determination, the load balancer optimizer 120 may cause the load balancer configuration 115 to switch from a least connections algorithm to a round robin algorithm for a period of time in order to mitigate the deleterious effects of the black hole problem on the service-oriented system. As another example, if performance metrics for a particular host indicate a comparatively high rate of CPU utilization, then the performance analysis component 130 may determine that a performance deviation is present. In one embodiment, the load balancer optimizer 120 may cause modification of the load balancer configuration 115 based on an anticipated and/or current performance problem as indicated by analysis of performance metrics.

In one embodiment, the load balancer optimizer 120 may restore the initial configuration of the load balancer 110 based on performance analysis. In one embodiment, the load balancer optimizer 120 may modify the configuration of the load balancer 110 multiple times based on performance analysis. Accordingly, performance metrics may be collected for the hosts 140A-140N and/or services 146A-146N after the load balancer configuration has been modified. In one embodiment, the load balancer configuration may be restored only after the performance metrics (as analyzed by the performance analysis component 130) indicate that one or more components in the service-oriented system are free of performance deviations. For example, the load balancing algorithm may be switched from a least connections algorithm to a round robin algorithm upon the deployment of a new host or service to the service-oriented system. While the load balancer 110 directs traffic based on the round robin algorithm, performance metrics may be collected for the new host or service, e.g., to determine whether the new host or service is contributing to a black hole problem. If the proper functioning of the new host or service can be verified through performance analysis based on the collected performance metrics, then the load balancer 110 may be switched back to the least connections algorithm. As another example, the weights associated with hosts or services in a round robin load balancing algorithm may be changed over and over again based on performance metrics collected for the hosts or services.

Figure 4A:
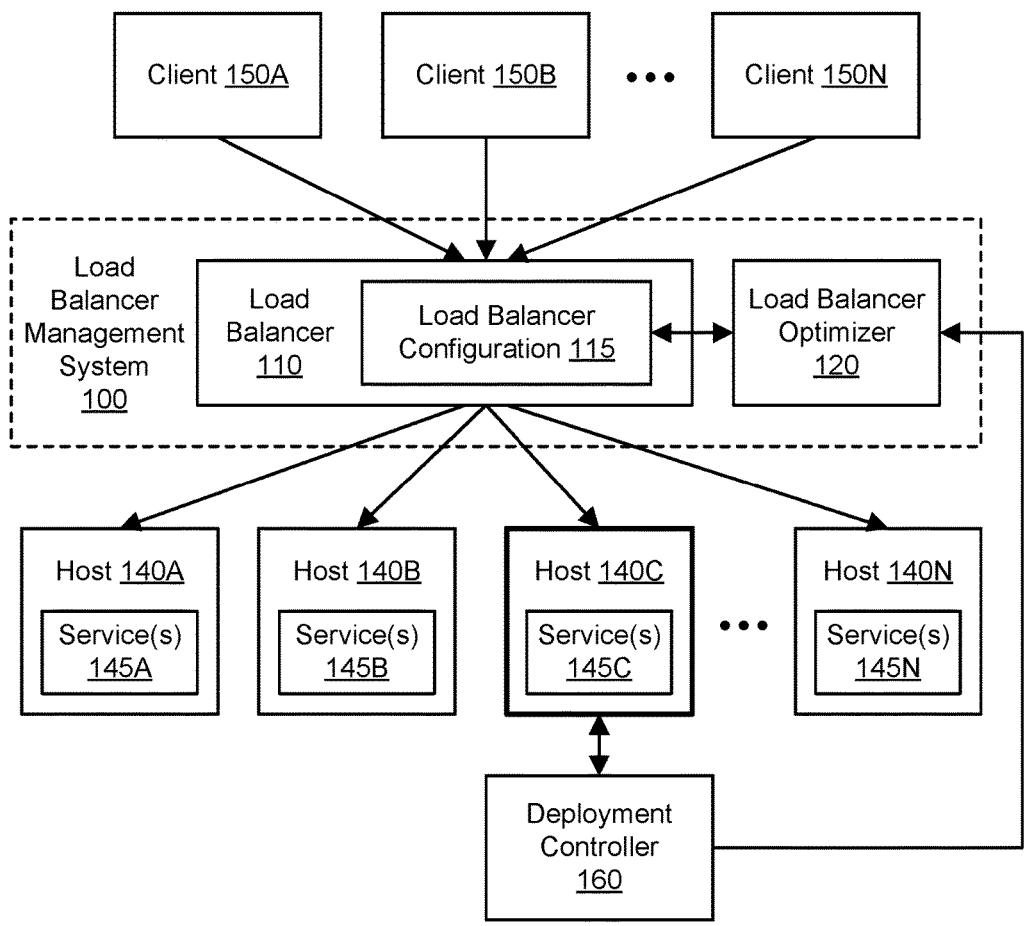
FIGS. 4A-4B illustrate example system environments for optimizing a load balancer configuration, including optimization in response to new component deployment, according to some embodiments.
Figure 4B:
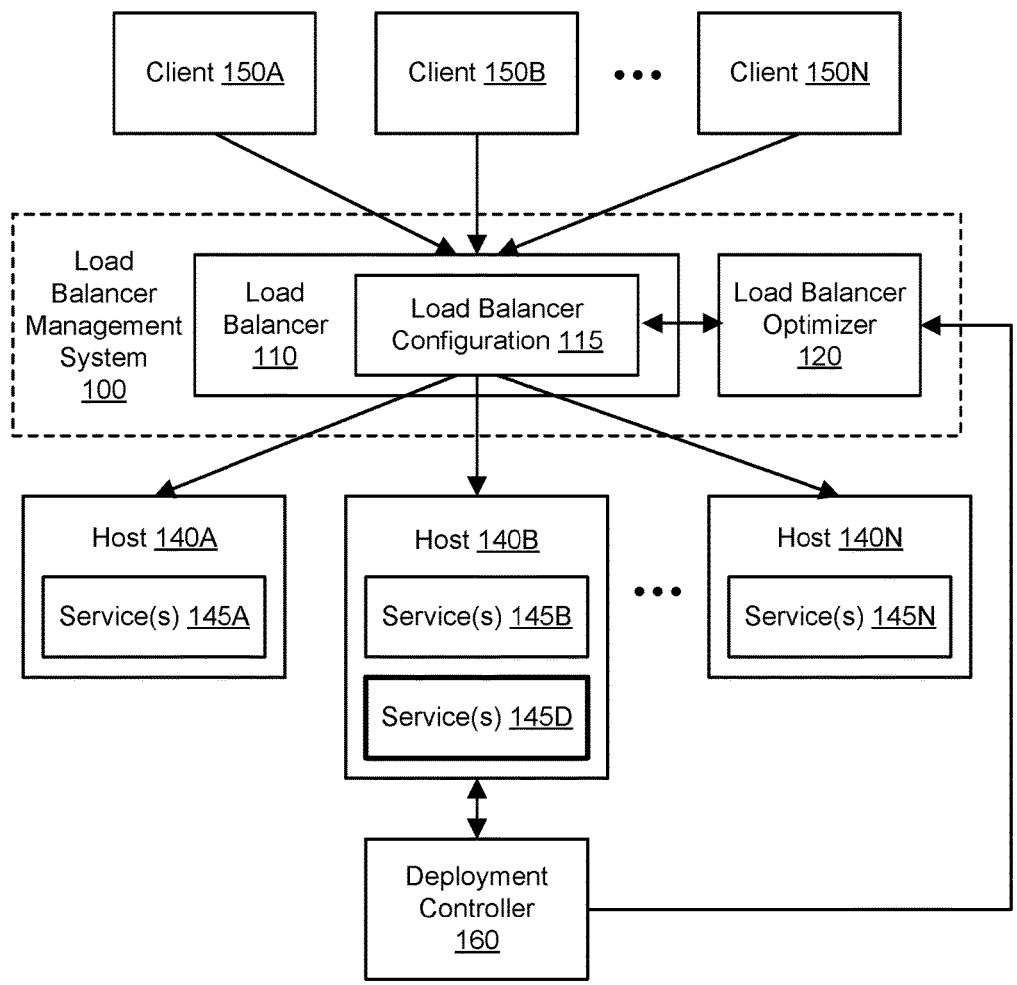

FIGS. 4A-4B illustrate example system environments for optimizing a load balancer configuration, including optimization in response to new component deployment, according to some embodiments. As used herein, the term "deployment" generally includes the addition of one or more new hosts, the addition of one or more new services to one or more hosts, and/or the addition of one or more new versions of one or more services to one or more hosts. However, it is contemplated that similar steps to modify a load balancer configuration may be taken in conjunction with the removal of one or more hosts or services. In one embodiment, a deployment controller 160 of the service-oriented system may provision and/or configure the hosts 140A-140N. For example, the hosts 140A-140N may be provisioned from a pool of available compute instances by selecting available compute instances with suitable specifications and configuring the selected compute instances with suitable software (e.g., selected ones of the services 145A-145N). In one embodiment, additional compute instances may be added to the service-oriented system as needed, e.g., using an autoscaling functionality. Similarly, compute instances may be returned to the pool of available compute instances from service-oriented system, e.g., if the computing instances are not needed at a particular point in time. Additionally, the software (e.g., services 145A-145N) installed on the hosts may be modified by the deployment controller 160. The deployment controller 160 may include one or more computing devices, any of which may be implemented by the example computing device 3000 illustrated in FIG. 6.

FIG. 4A illustrates a system environment for optimizing a load balancer configuration, including optimization in response to new host deployment, according to some embodiments. The deployment controller 160 may cause or oversee the deployment of a new host 140C to the service-oriented system. The new host 140C may be deployed using an auto-scaling functionality or based on direct instructions from a user. The new host 140C may implement one or more services 145C. The deployment controller 160 may communicate the deployment of the new host 140C to the load balancer optimizer 120, e.g., by sending appropriate data indicative of the deployment. Based on the deployment of the new host 140C, the load balancer optimizer 120 may initiate the modification of the load balancer configuration 115 as discussed above.

FIG. 4B illustrates a system environment for optimizing a load balancer configuration, including optimization in response to new service deployment, according to some embodiments. The deployment controller 160 may cause or oversee the deployment of one or more new services 145D to the service-oriented system. The new service(s) 145D may represent one or more new services, one or more new versions of a service, and/or one or more new instances of an existing service. The new service(s) 145D may be deployed using an auto-scaling functionality or based on direct instructions from a user. The deployment controller 160 may communicate the deployment of the new service(s) 145D to the load balancer optimizer 120, e.g., by sending appropriate data indicative of the deployment. Based on the deployment of the new service(s) 145D, the load balancer optimizer 120 may initiate the modification of the load balancer configuration 115 as discussed above.

Figure 5A:
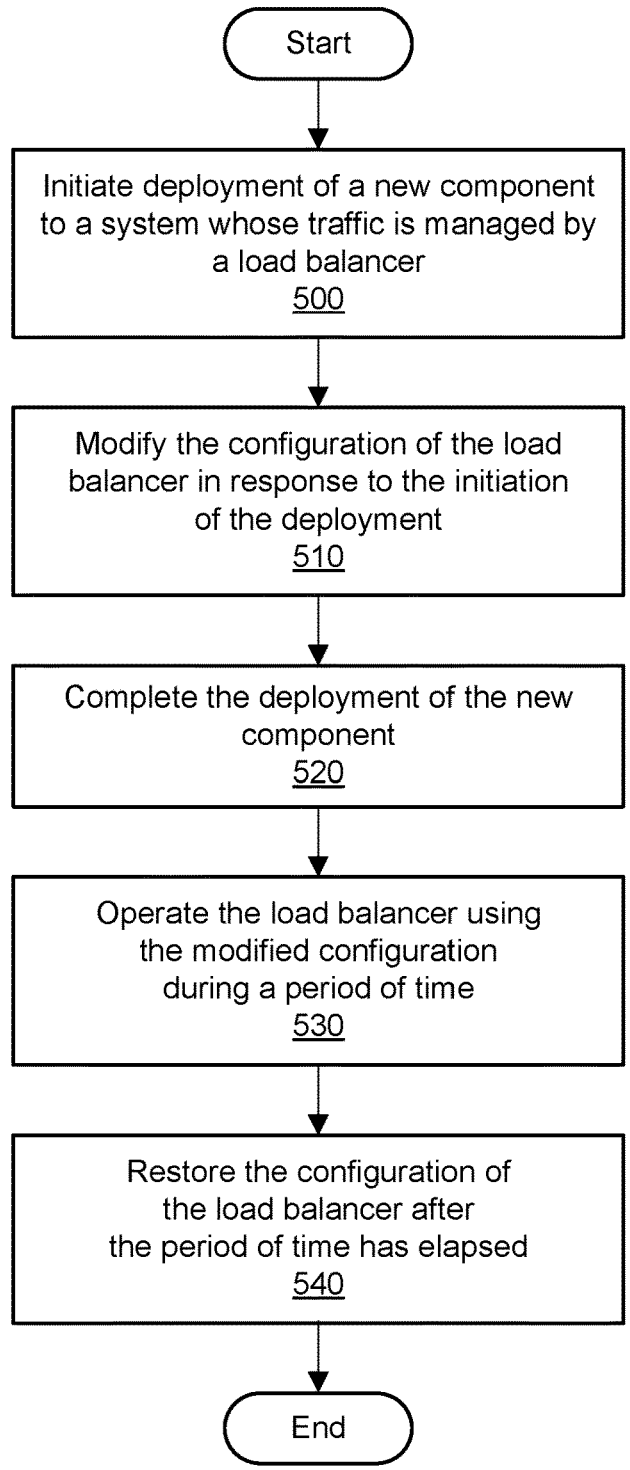
FIG. 5A is a flowchart illustrating a method for optimizing a load balancer configuration, including proactive modification in response to new component deployment, according to some embodiments.

FIG. 5A is a flowchart illustrating a method for optimizing a load balancer configuration, including proactive modification in response to new component deployment, according to some embodiments. A new component may be deployed to a system (e.g., a distributed system and/or service-oriented system). The new component may include one or more new services, one or more new versions of one or more new services, and/or one or more new hosts. However, it is contemplated that similar steps to modify a load balancer configuration may be taken in conjunction with the removal of one or more hosts or services. A load balancer may perform traffic management for the system by directing each client request received at the load balancer to a particular host selected by the load balancer. The particular host may be selected by the load balancer based on a load balancer configuration. The load balancer configuration may include a load balancer algorithm.

As shown in 500, the deployment of the new component may be initiated. As shown in 510, the configuration of the load balancer may be modified in response to the initiation of the deployment of the new component. In one embodiment, the modification of the load balancer configuration may be performed as a step in a workflow associated with the deployment. In one embodiment, some aspects of the deployment may be performed prior to the modification of the load balancer configuration, and other aspects of the deployment may be performed after the modification of the load balancer configuration. For example, the configuration of the load balancer may be modified in response to initiation of the deployment of the new component but before the new component is in production or otherwise "live" and serving requests. Accordingly, as shown in 520, the deployment of the new component may be completed after the configuration of the load balancer has been modified.

The load balancer configuration immediately prior to the operation shown in 510 may be referred to as the initial configuration of the load balancer. The modification of the load balancer configuration in 510 may change the configuration from a first or initial state to a second or modified state. In one embodiment, the modification may change the load balancer algorithm implemented by the load balancer to select a host for each incoming request. For example, the load balancer algorithm may be changed from a least connections algorithm to a round robin algorithm in response to the deployment of the new component. Alternatively, another aspect of the configuration, such as the weights associated with one or more hosts in a round robin algorithm, may be changed. The modification of the load balancer configuration may change the way in which the load balancer performs traffic management for the system, e.g., by changing the basis for selecting a host to which a particular request is directed by the load balancer.

As shown in 530, the load balancer may operate using the modified configuration for a period of time. During the period of time, the load balancer may select hosts and direct requests to hosts based on the modified configuration. In one embodiment, the duration of the period of time may be configured by a user, i.e., based on user input. In one embodiment, the end of the period of time may be based on the analysis of performance metrics. For example, latency metrics for all hosts may be collected and analyzed during the period of time to determine whether any of the hosts is rapidly failing all incoming requests. If no such "black hole problem" is detected, then the period of time may end. In one embodiment, the end of the period of time may be determined based on the analysis of performance metrics after an initial period of time (e.g., a user-configurable fixed duration) has elapsed or at regular intervals.

As shown in 540, the configuration of the load balancer may be restored after the period of time has elapsed. The restoration of the load balancer configuration in 540 may change the configuration from the second or modified state to the first or initial state. In one embodiment, the restoration may change the load balancer algorithm implemented by the load balancer to select a host for each incoming request. For example, the load balancer algorithm may be restored from the round robin algorithm to the least connections algorithm after the period of time has elapsed. Alternatively, another aspect of the configuration, such as the weights associated with one or more hosts in a round robin algorithm, may be restored to the initial configuration. The restoration of the load balancer configuration may change the way in which the load balancer performs traffic management for the system, e.g., by changing the basis for selecting a host to which a particular request is directed by the load balancer. In one embodiment, the restoration of the load balancer configuration may be performed as a step in a workflow associated with the deployment.

Figure 5B:
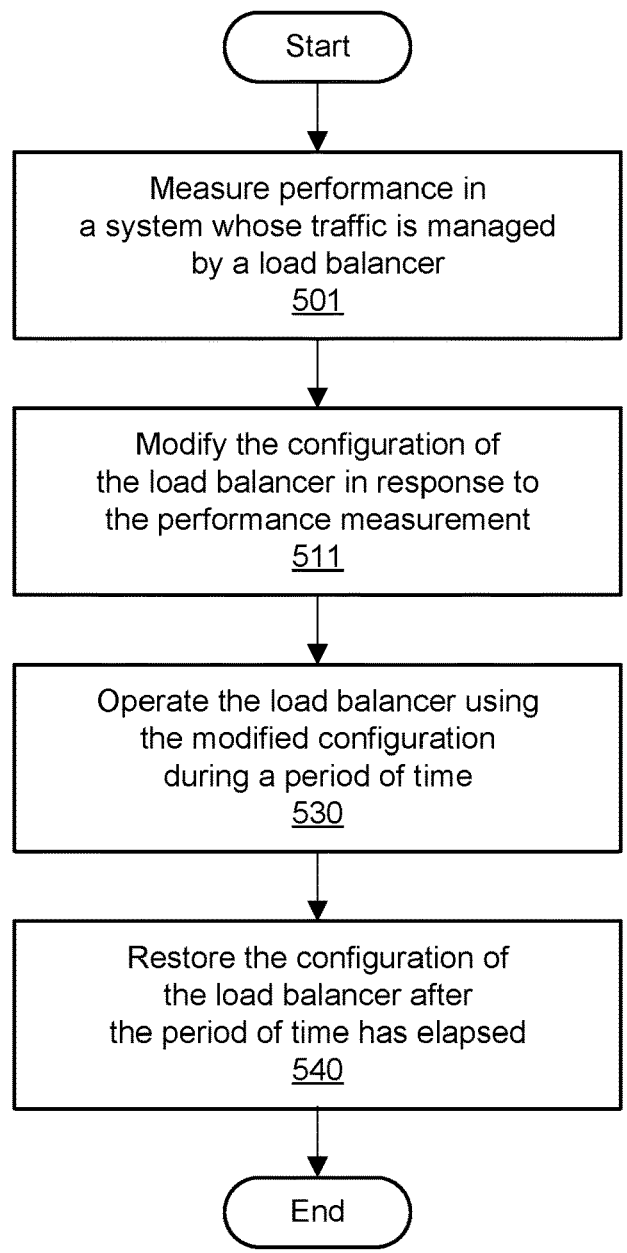
FIG. 5B is a flowchart illustrating a method for optimizing a load balancer configuration, including reactive or proactive modification in response to performance measurement, according to some embodiments.

FIG. 5B is a flowchart illustrating a method for optimizing a load balancer configuration, including reactive or proactive modification in response to performance measurement, according to some embodiments. As shown in 501, the performance of one or more components in a system (e.g., a distributed system and/or service-oriented system) may be measured. The performance measurement may detect a performance deviation. The performance deviation may be detected in one or more hosts or services. The performance deviation may be detected using any suitable techniques, e.g., using instrumentation of hosts and/or services to collect performance metrics periodically and using a centralized component to analyze the collected metrics. Measuring the performance in the system may include determining the current performance and/or predicting the future performance.

A load balancer may perform traffic management for the system by directing each client request received at the load balancer to a particular host selected by the load balancer. The particular host may be selected by the load balancer based on a load balancer configuration. The load balancer configuration may include a load balancer algorithm. In one embodiment, the performance deviation may include a comparatively low latency for a particular host. The comparatively low latency may tend to indicate that the particular host is rapidly failing incoming requests and thus contributing to a "black hole problem" in which the load balancer is sending a disproportionate amount of traffic to the particular host based on a least connections algorithm. As another example, the performance deviation may include a comparatively high rate of processor usage at one or more hosts which tends to predict slow performance for the handling of future requests.

As shown in 511, the configuration of the load balancer may be modified in response to the performance measurement. In one embodiment, the configuration of the load balancer may be modified in response to the detection or prediction of a performance deviation based on the performance measurement. The load balancer configuration immediately prior to the operation shown in 511 may be referred to as the initial configuration of the load balancer. The modification of the load balancer configuration in 511 may change the configuration from a first or initial state to a second or modified state. In one embodiment, the modification may change the load balancer algorithm implemented by the load balancer to select a host for each incoming request. For example, the load balancer algorithm may be changed from a least connections algorithm to a round robin algorithm in response to the detection of a black hole problem in one or more hosts. Alternatively, another aspect of the configuration, such as the weights associated with one or more hosts in a round robin algorithm, may be changed. The modification of the load balancer configuration may change the way in which the load balancer performs traffic management for the system, e.g., by changing the basis for selecting a host to which a particular request is directed by the load balancer.

As shown in 530, the load balancer may operate using the modified configuration for a period of time. During the period of time, the load balancer may select hosts and direct requests to hosts based on the modified configuration. In one embodiment, the duration of the period of time may be configured by a user, i.e., based on user input. In one embodiment, the end of the period of time may be based on the analysis of performance metrics. For example, latency metrics for all hosts may be collected and analyzed during the period of time to determine whether any of the hosts is rapidly failing all incoming requests. If no such black hole problem is detected, then the period of time may end. In one embodiment, the end of the period of time may be determined based on the analysis of performance metrics after an initial period of time (e.g., a user-configurable fixed duration) has elapsed or at regular intervals.

As shown in 540, the configuration of the load balancer may be restored after the period of time has elapsed. The restoration of the load balancer configuration in 540 may change the configuration from the second or modified state to the first or initial state. In one embodiment, the restoration may change the load balancer algorithm implemented by the load balancer to select a host for each incoming request. For example, the load balancer algorithm may be restored from the round robin algorithm to the least connections algorithm after the period of time has elapsed. Alternatively, another aspect of the configuration, such as the weights associated with one or more hosts in a round robin algorithm, may be restored to the initial configuration. The restoration of the load balancer configuration may change the way in which the load balancer performs traffic management for the system, e.g., by changing the basis for selecting a host to which a particular request is directed by the load balancer.

Figure 5C:
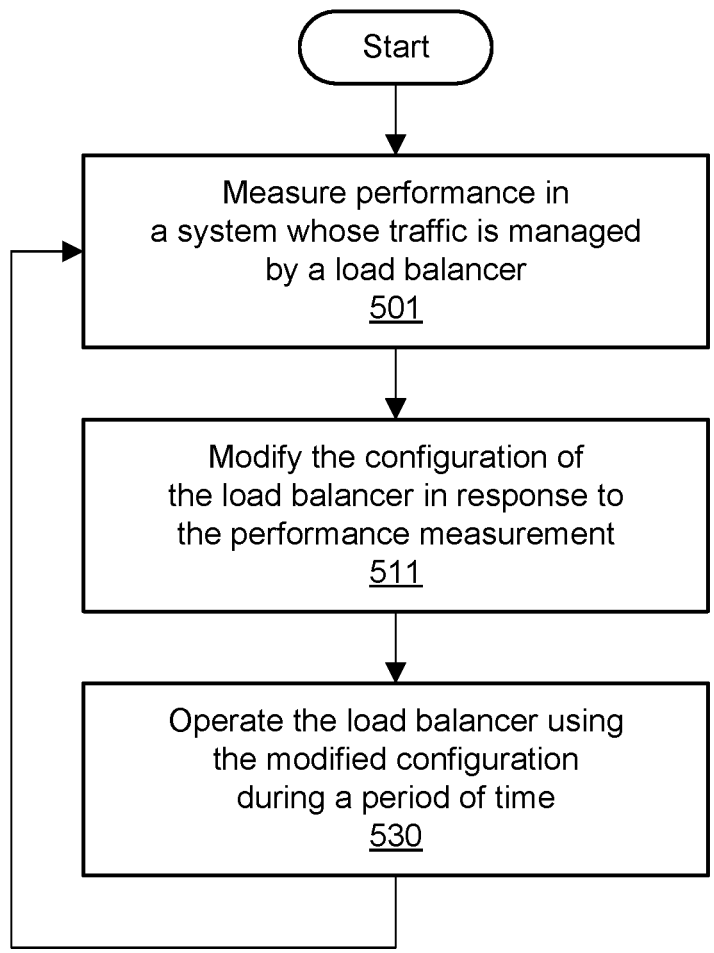
FIG. 5C is a flowchart illustrating a method for optimizing a load balancer configuration, including continuous modification in response to performance measurement, according to some embodiments.

FIG. 5C is a flowchart illustrating a method for optimizing a load balancer configuration, including continuous modification in response to performance measurement, according to some embodiments. As shown in 501, the performance of one or more components in a system (e.g., a distributed system and/or service-oriented system) may be measured. The performance measurement may detect a performance deviation. The performance deviation may be detected in one or more hosts or services. The performance deviation may be detected using any suitable techniques, e.g., using instrumentation of hosts and/or services to collect performance metrics periodically and using a centralized component to analyze the collected metrics. Measuring the performance in the system may include determining the current performance and/or predicting the future performance.

A load balancer may perform traffic management for the system by directing each client request received at the load balancer to a particular host selected by the load balancer. The particular host may be selected by the load balancer based on a load balancer configuration. The load balancer configuration may include a load balancer algorithm. In one embodiment, the performance deviation may include a comparatively low latency for a particular host. The comparatively low latency may tend to indicate that the particular host is rapidly failing incoming requests and thus contributing to a "black hole problem" in which the load balancer is sending a disproportionate amount of traffic to the particular host based on a least connections algorithm. As another example, the performance deviation may include a comparatively high rate of processor usage at one or more hosts which tends to predict slow performance for the handling of future requests.

As shown in 511, the configuration of the load balancer may be modified in response to the performance measurement. In one embodiment, the configuration of the load balancer may be modified in response to the detection or prediction of a performance deviation based on the performance measurement. The load balancer configuration immediately prior to the operation shown in 511 may be referred to as the initial configuration of the load balancer. The modification of the load balancer configuration in 511 may change the configuration from a first or initial state to a second or modified state. In one embodiment, the modification may change the load balancer algorithm implemented by the load balancer to select a host for each incoming request. For example, the load balancer algorithm may be changed from a least connections algorithm to a round robin algorithm in response to the detection of a black hole problem in one or more hosts. Alternatively, another aspect of the configuration, such as the weights associated with one or more hosts in a round robin algorithm, may be changed. The modification of the load balancer configuration may change the way in which the load balancer performs traffic management for the system, e.g., by changing the basis for selecting a host to which a particular request is directed by the load balancer.

As shown in 530, the load balancer may operate using the modified configuration for a period of time. During the period of time, the load balancer may select hosts and direct requests to hosts based on the modified configuration. In one embodiment, the duration of the period of time may be configured by a user, i.e., based on user input. In one embodiment, the end of the period of time may be based on the analysis of performance metrics. For example, latency metrics for all hosts may be collected and analyzed during the period of time to determine whether any of the hosts is rapidly failing all incoming requests. If no such black hole problem is detected, then the period of time may end. In one embodiment, the end of the period of time may be determined based on the analysis of performance metrics after an initial period of time (e.g., a user-configurable fixed duration) has elapsed or at regular intervals.

After the load balancer is operated using the modified configuration for the period of time, the performance of the system may again be measured, as shown in 501. The repeated measurement of the performance of the system may be performed based on performance metrics collected during the period of time indicated in 530. The operations shown in 511 and 530 may then be performed again. In this manner, the configuration of the load balancer may be continuously or repeatedly adjusted in response to current and/or anticipated conditions in the system.

Illustrative Computer System

Figure 6:
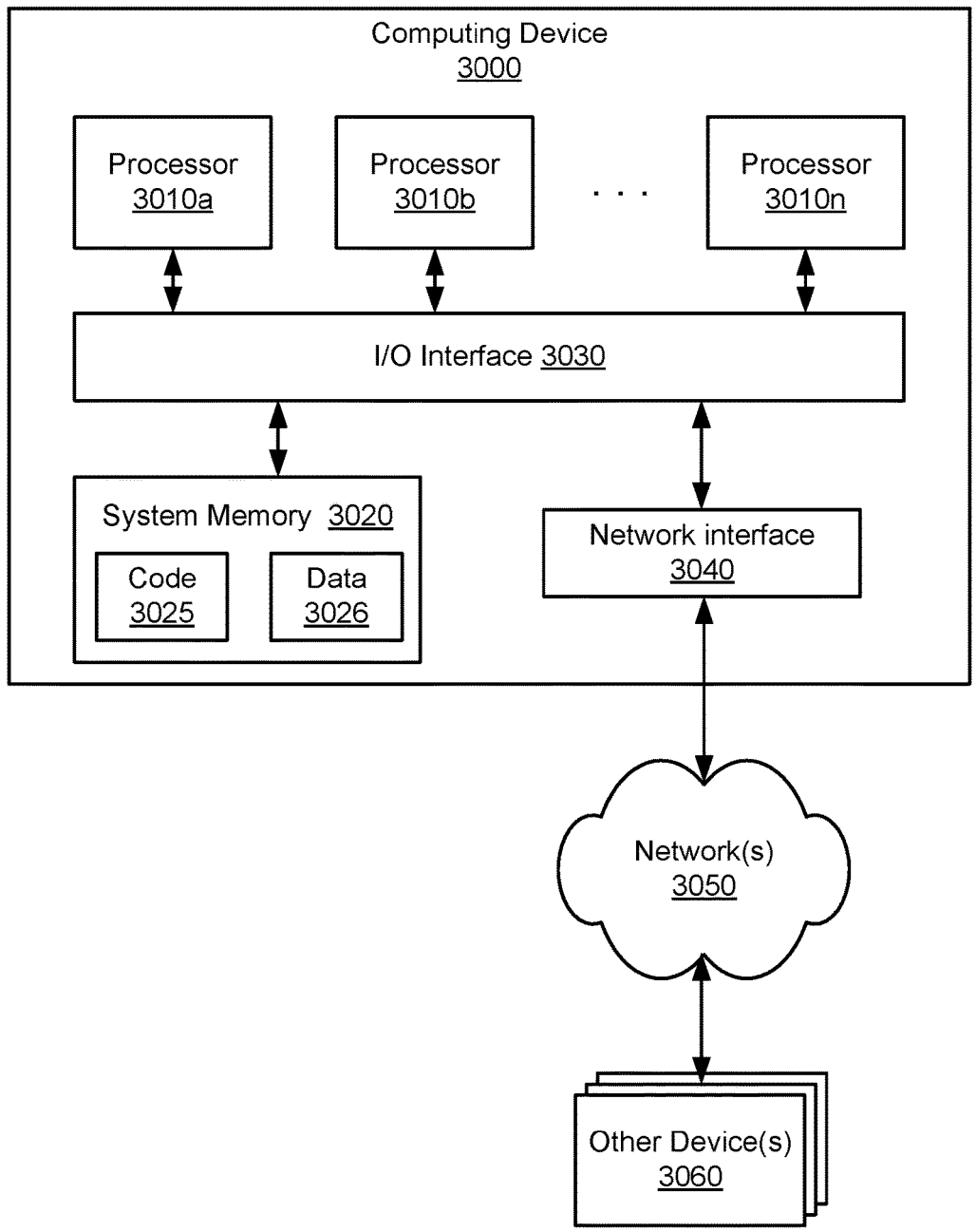
FIG. 6 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 6 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement:
in response to initiation of a deployment of one or more new components to a system, switch a load balancing configuration of a load balancer configured to direct a plurality of requests to a plurality of hosts in the system based on a load balancing configuration from a first load balancing configuration to a second load balancing configuration;
determine, based on analysis of performance metrics for the plurality of hosts that indicate an aspect of computing performance for the hosts, to switch the load balancing configuration of the load balancer; and
switch, based at least in part on said determine, the load balancing configuration of the load balancer from the second load balancing configuration to the first load balancing configuration.

2. The system as recited in claim 1, wherein, to switch the load balancing configuration of the load balancer from the first load balancing configuration to the second load balancing configuration, the one or more computing devices are configured to prioritize availability over latency and cost in the system, and wherein, to switch the load balancing configuration of the load balancer from the second balancing configuration to the first load balancing configuration, the one or more computing devices are configured to prioritize latency and cost over availability in the system.

3. The system as recited in claim 1, wherein the one or more performance metrics are used to calculate a duration of a period of time before said switch the load balancing configuration of the load balancer from the second load balancing configuration to the first load balancing configuration.

4. The system as recited in claim 1, wherein the one or more computing devices are configured to:
collect the one or more performance metrics for the system during a period of time; and based on the one or more performance metrics, determine that the deployment is successful;
wherein the load balancing configuration of the load balancer is switched from the second load balancing configuration to the first load balancing configuration in response to said determine that the deployment is successful.

5. The system as recited in claim 1, wherein the one or more new components comprise one or more new services or one or more new versions of one or more services.

6. The system as recited in claim 5, wherein the one or more new components comprise one or more additional hosts.

7. The system as recited in claim 5, wherein the one or more computing devices are configured to:
collect, after said switch the configuration of the load balancer from the first load balancing configuration to the second load balancing configuration, one or more performance metrics for the system; and
determine, based on the one or more performance metrics, that the one or more new components have been deployed successfully;
wherein the configuration of the load balancer is restored from the second load balancing configuration to the first load balancing configuration in response to said determine that the new component has been deployed successfully.

8. A method, comprising:
collecting, for one or more hosts of a plurality of hosts of a system, one or more performance metrics that indicate an aspect of computing performance for the one or more hosts;
determining, based on the one or more performance metrics for the one or more hosts, that a future performance deviation in the system is likely;
switching, in response to said determining that the future performance deviation is likely, a load balancing configuration of a load balancer that directs a plurality of requests to the plurality of hosts in the system, from a first load balancing configuration to a second load balancing configuration; and
operating the load balancer based in the second load balancing configuration for a period of time.

9. The method as recited in claim 8, wherein said switching the configuration of the load balancer from the first load balancing configuration to the second load balancing configuration comprises switching a load balancing configuration implemented by the load balancer from a least connections configuration to a round robin configuration.

10. The method as recited in claim 8, further comprising restoring, after the period of time, the configuration of the load balancer from the second load balancing configuration to the first load balancing.

11. The method as recited in claim 10, wherein said determining, based on the one or more performance metrics for the one or more hosts, that a future performance deviation in the system is likely comprises prioritizing availability over latency and cost in the system, and wherein said restoring the configuration of the load balancer from the second load balancing configuration to the first load balancing configuration comprises prioritizing latency and cost over availability in the system.

12. The method as recited in claim 8, wherein switching the configuration of the load balancer from the first load balancing configuration to the second load balancing configuration comprises switching a respective weight for one or more hosts in a round robin load balancing configuration.

13. A non-transitory computer-readable storage medium storing program instructions computer-executable to perform:
collecting, for one or more hosts of a plurality of hosts of a system, performance metrics that indicate an aspect of computing performance for the one or more hosts;
determining, based on the one or more performance metrics for the one or more hosts, that a future performance deviation in the system is likely;
switching, in response to said determining that the future performance deviation is likely, a load balancing configuration of a load balancer that directs a plurality of requests to the plurality of hosts in the system, from a first load balancing configuration to a second load balancing configuration; and
operating the load balancer based in the second load balancing configuration for a period of time.

14. The non-transitory computer-readable storage medium as recited in claim 13, wherein the program instructions are further computer-executable to perform:
obtaining a plurality of additional performance metrics for the system after switching the load balancing configuration from the first load balancing configuration to the second load balancing configuration;
performing an analysis of the plurality of additional performance metrics; and
adjusting the load balancing configuration one or more additional times based on the analysis of the additional performance metrics.

15. The non-transitory computer-readable storage medium as recited in claim 13, wherein the program instructions are further computer-executable to perform:
collecting one or more additional performance metrics for the system during the period of time;
predicting a second performance deviation in the system based on the one or more additional performance metrics;
switching the load balancing configuration of the load balancer from the second load balancing configuration to a third load balancing configuration in response to predicting the second performance deviation; and
operating the load balancer based on the third load balancing configuration for a second period of time.

16. The non-transitory computer-readable storage medium as recited in claim 13, wherein the first load balancing configuration comprises a first set of weights for the plurality of hosts in a round robin load balancing algorithm, and wherein the second load balancing configuration comprises a second set of weights for the plurality of hosts in the round robin load balancing algorithm.

17. The non-transitory computer-readable storage medium as recited in claim 13, wherein the load balancing configuration comprises a load balancing algorithm, wherein the first load balancing configuration comprises a first load balancing algorithm, and wherein the second load balancing configuration comprises a second load balancing algorithm.

18. The non-transitory computer-readable storage medium as recited in claim 13, wherein a duration of the period of time is determined based on one or more additional performance metrics.

19. The non-transitory computer-readable storage medium as recited in claim 13, wherein a duration of the period of time is determined based on user input.

20. The non-transitory computer-readable storage medium as recited in claim 13, wherein said determining that the future performance deviation in the system is likely comprises determining one or more indicators of an impending performance degradation relative to a threshold.

* * * * *